United States Patent [19]
Nishino et al.

[11] Patent Number: 4,928,664
[45] Date of Patent: May 29, 1990

[54] PULSE COMBUSTION HEATING APPARATUS

[75] Inventors: Hiroshi Nishino; Susumu Ejiri; Nobuyoshi Yokoyama, all of Nagoya, Japan

[73] Assignee: Paloma Kogyo Kabushiki Kaisha, Nagoya, Japan

[21] Appl. No.: 401,913

[22] Filed: Sep. 1, 1989

[30] Foreign Application Priority Data

Sep. 2, 1988 [JP]  Japan .......................... 63-116334[U]

[51] Int. Cl.$^5$ ............................................ A47J 27/00
[52] U.S. Cl. ........................................ 126/391; 431/1; 126/360 R
[58] Field of Search ................. 431/1; 126/391, 343.5, 126/360 R

[56] References Cited

U.S. PATENT DOCUMENTS

| | | | |
|---|---|---|---|
| 4,241,723 | 12/1980 | Kitchen | 431/1 |
| 4,619,601 | 10/1986 | Sumitani | 431/1 |
| 4,628,903 | 12/1986 | Farnsworth et al. | 126/391 |
| 4,808,107 | 2/1989 | Yokoyama et al. | 431/1 |

*Primary Examiner*—Carroll B. Dority
*Attorney, Agent, or Firm*—Berman, Aisenberg & Platt

[57] ABSTRACT

A pulse combustion heating apparatus includes a open-top vessel assembled within a support frame to store an amount of liquid such as cooking oil to be heated, and a pulse combustion burner mounted to the vessel and having a combustion chamber secured at its inlet end to a side wall of the vessel and immersed in the liquid in the vessel and at least a pair of tailpipes each connected at their inner ends to an exhaust port of the combustion chamber in such a manner that the tailpipes are arranged symmetrically in the vessel and immersed in the liquid and being extended outwardly from the vessel. The vessel has a pair of parallel bottom walls inclined downwardly inwardly toward the center of the vessel, and a pair of cylindrical decouplers are housed in a pair of spaces just below the bottom walls of the vessel within the support frame and located in parallel along the bottom walls of the vessel. The decouplers are connected to each exhaust end of the tailpipes to stabilize pulse combustion in the combustion chamber.

5 Claims, 2 Drawing Sheets

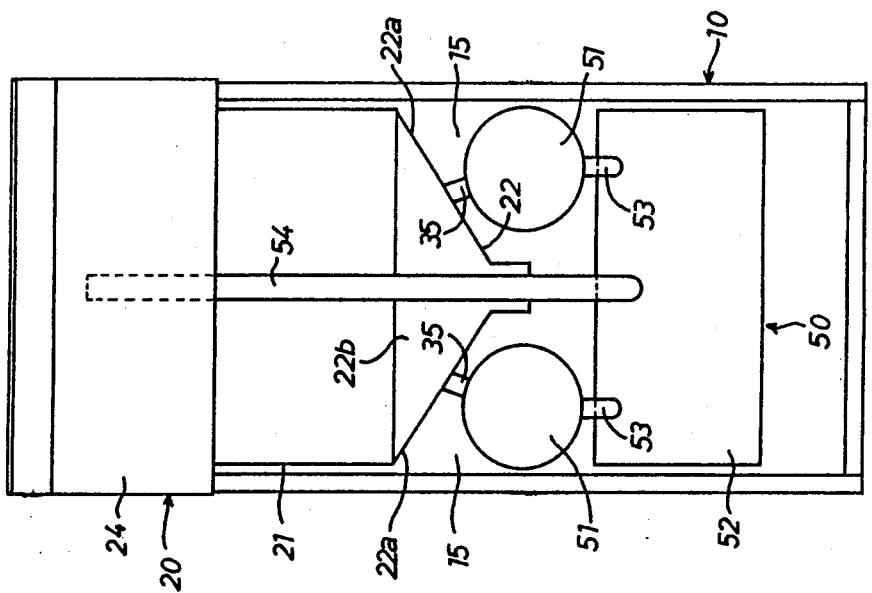
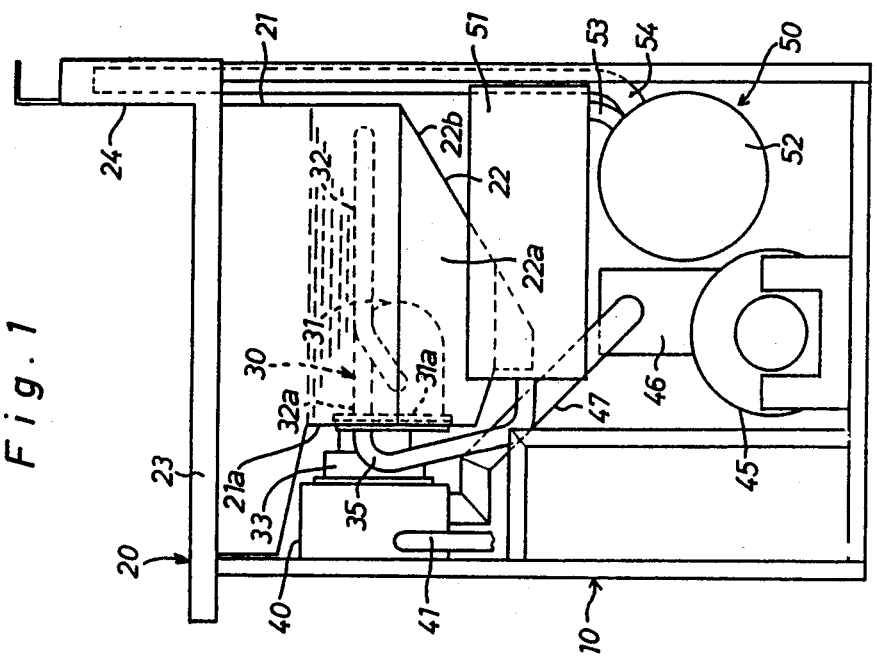

PULSE COMBUSTION HEATING APPARATUS

BACKGROUND OF THE INVENTION

1. Field of the Invention

The present invention relates to a pulse combustion heating apparatus, more particularly to a liquid heating apparatus of the type in which a pulse combustion burner is mounted to a liquid vessel to heat an amount of liquid such as cooking oil or other fluid medium stored therein.

2. Description of the Prior Art

In such a conventional liquid heating apparatus as described above, the liquid vessel is assembled within a support frame, and the pulse combustion burner includes a combustion chamber secured at its inlet end to the inner surface of a forward side wall of the vessel in a liquid-tight manner and immersed in liquid in the vessel. The combustion chamber of the burner has an exhaust port connected to a tailpipe the great part of which is immersed in the liquid. To enhance heat exchange efficiency in the heating apparatus, at least a pair of tailpipes are connected at their inner ends to the combustion chamber to increase the surface area for heat exchange with the liquid. In the heating apparatus, the bottom of the vessel is, in general, inclined downwardly to facilitate discharge of the wasted liquid therefrom, and a decoupler of large capacity is located below the bottom of the vessel and connected in common to each exhaust end of the tailpipes to stabilize pulse combustion in the combustion chamber. The decoupler is formed therein with an expansion chamber the capacity of which is more than 10 times the capacity of the combustion chamber.

In such an arrangement as described above, it is required to provide the decoupler at a position equally spaced from both the tailpipes. Additionally, the bottom of the vessel is formed in a complicated configuration, while the decoupler is formed in a simple cylindrical shape suitable for mass production. For these reasons, a useless dead space is remained in the interior of the support frame, resulting in enlargement of the heating apparatus in size.

SUMMARY OF THE INVENTION

It is, therefore, a primary object of the present invention to provide an improved liquid heating apparatus wherein a pair of cylindrical decouplers are assembled in a compact arrangement within a support frame without remaining any useless dead space in the frame.

A secondary object of the present invention is to provide an improved liquid heating apparatus, having the above-mentioned characteristics, wherein the decouplers each can be formed approximately in a half size of the conventional decoupler of large capacity connected in common to the tailpipes.

According to the present invention, the objects are attained by providing a liquid heating apparatus of the pulse combustion type which comprises a liquid vessel assembled within a support frame to store an amount of liquid such as cooking oil or other fluid medium to be heated, and a pulse combustion burner mounted to the vessel and having a combustion chamber secured at its inlet end to a side wall of said vessel and immersed in the liquid in the vessel and at least a pair of tailpipes each connected at their inner ends to an exhaust port of the combustion chamber in such a manner that the tailpipes are arranged symmetrically in the vessel and immersed in the liquid and being extended outwardly from the vessel, wherein the vessel has a pair of parallel bottom walls inclined dowardly inwardly toward the center of the vessel, and a pair of cylindrical decouplers are housed in a pair of spaces just below the bottom walls of the vessel within the support frame and located in parallel along the bottom walls of the vessel, the decouplers being connected to each exhaust end of the tailpipes to stabilize pulse combustion in the combustion chamber.

BRIEF DESCRIPTION OF THE DRAWINGS

Other objects, features and advantages of the present invention will be more readily appreciated from the following detailed description of a preferred embodiment thereof when considered with reference to the accompanying drawings, in which:

FIG. 1 is a schematic side elevation view of a liquid heating apparatus in accordance with the present invention, partially shown in section to illustrate certain features of the heating apparatus;

FIG. 2 is a rear view of the heating apparatus shown in FIG. 1; and

DESCRIPTION OF THE PREFERRED EMBODIMENT

Figure 3:
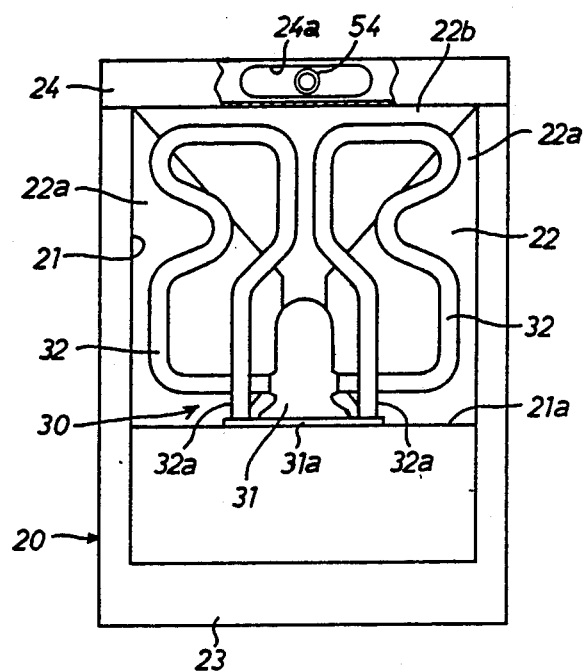
FIG. 3 is a partly broken plan view of the heating apparatus.

In FIGS. 1–3 of the drawings, there is illustrated a liquid heating apparatus in the form of a deep fat dryer which includes an open top liquid vessel 20 of generally rectangular in shape assembled within a support frame 10 to store therein an amount of cooking oil or other fluid medium to be heated. The liquid vessel 20 has a vessel body 21 integrally formed with an upper horizontal flange 23 of generally rectangular in shape which is mounted on the support frame 10 to support the liquid vessel 20 in place. An upright stack 24 of rectangular in shape is provided on the support frame 10 at the rear end of horizontal flange 23 of vessel 20. As shown in FIGS. 1 and 2, the vessel body 21 has an upright forward side wall 21a, a pair of parallel bottom walls 22a downwardly inwardly inclined toward the center of vessel body 21 and a rearward bottom wall 22b inclined toward the center of vessel body 21. The vessel body 21 is provided at its bottommost part with a drain plug (not shown) for discharge of wasted liquid.

As shown in FIGS. 1 and 3, a pulse combustion burner 30 is mounted to the forward side wall 21a of vessel 20 and immersed in liquid in the vessel 20. The pulse combustion burner 30 includes, as main components, a combustion chamber 31, a pair of tailpipes 32, and an air-fuel mixer head 33. The combustion chamber 31 is integrally formed at its inlet end with an attachment flange 31a which is secured to the inner surface of forward side wall 21a through a gasket in a liquid-tight manner by means of screws. The tailpipes 32 are welded at their inner ends to a pair of exhaust ports of combustion chamber 31 and are arranged symmetrically in loop shape within the interior of vessel body 21. The tailpipes 32 are extended outwardly through an upper portion of the attachment flange 31a and the forward side wall 21a of vessel 20 and are welded at their exhaust end portions 32a to the attachment flange 31. The tailpipes 32 are connected at their exhaust end portions 32a to a pair of extension pipes 35 which are secured at their one ends to the outer surface of forward side wall 21a. The air-fuel mixer head 33 is fixedly mounted to the outer surface of forward side wall 21a in an air-tight manner and is in open communication with the interior of combustion chamber 31 to supply a mixture of gaseous fuel and air thereinto.

As shown in FIG. 1, an air chamber casing 40 is attached to the inlet end of air-fuel mixer head 33 to form an air intake chamber. The air chamber casing 40 is connected to an electrically operated air blower 45 by way of an air intake muffler 46 and an air supply pipe 47 to forcibly supply fresh air into the mixer head 33. The air-fuel mixer head 33 is provided therein with an air inlet flapper valve (not shown) for permitting only the inward flow of fresh air supplied therethrough into the mixer head 33 and with a fuel inlet flapper valve (not shown) for permitting only the inward flow of gaseous fuel supplied therethrough into the mixer head 33. The air chamber casing 40 is provided therein with a gas container (not shown) which is connected to a source of gaseous fuel (not shown) by means of a gas supply conduit 41. The gas supply conduit 41 is provided therein with an electromagnetic valve (not shown) for control of the flow quantity of gaseus fuel supplied therethrough into the gas container. The air-fuel mixer head 33 is connected to the gas container to be supplied with the gaseous fuel therefrom through the fuel inlet flapper valve.

As shown in FIGS. 1 and 2, the extension pipes 35 are connected to an exhaust muffler assembly 50 which includes a pair of decouplers 51 connected at their inlets to the extension pipes 35 and a single exhaust muffler 52 connected to both the decouplers 51 by means of a pair of pipes 53. The decouplers 51 each are formed in a cylindrical body to have an expansion chamber the capacity of which is more than 10 times the capacity of combustion chamber 31. In this embodiment, the decouplers 51 are housed in a pair of spaces 15 just below the bottom walls 22a of vessel body 21 within the support frame 10 and located in parallel along the bottom walls 22a of vessel body 21 in a fore-and-aft direction. The decouplers 51 are secured in place to the support frame 10 in an appropriate manner. In operation, the decouplers 51 act to stabilize pulse combustion in the combustion chamber 31 and to absorb combustion noises applied thereto from tailpipes 32. The exhaust muffler 52 is formed in a cylindrical body the diameter of which is larger than each diameter of the decouplers 51. The exhaust muffler 52 is located just below the decouplers 51 in a direction perpendicular to them and mounted within the support frame 10 in an appropriate manner. In operation, the exhaust muffler 52 acts to further absorb the combustion noises applied thereto from the decouplers 51. An exhaust pipe 54 is connected at its lower end to the central portion of muffler 52 and extended upwardly along the rear portion of support frame 10 to exhaust the combustion products therefrom. The upper end of exhaust pipe 54 is located in the upright stack 24 which has an upper wall formed with an elongated opening 24a as shown in FIG. 3.

In operation of the heating apparatus, the electromagnetic valve in gas supply conduit 41 is opened to effect the supply of gaseous fuel into the gas container, while the air blower 45 is operated for a predetermined short period of time to effect the supply of air into the air chamber casing 40. Thus, the mixer head 33 is supplied with the gaseous fuel and air from the gas container and casing 40 through the flapper valves to supply a mixture of the gaseous fuel and air into the combustion chamber 31 therefrom. The mixture is iginited by energization of a spark plug (not shown) in the combustion chamber 31. When explosive combustion of the mixture takes place at a high temperature in the combustion chambers 31, the flapper valves in mixer head 33 are closed by a momentary positive pressure in the combustion chamber 31 to block the inward flow of gaseous fuel and air into the mixer head 33, and the combustion products are exhausted through the tailpipes 32, extension pipes 35, and muffler assembly 50. Ignition and combustion are followed by a contraction which produces a momentary negative pressure in the tailpipes for drawing in a fresh supply of gaseous fuel and air through the flapper valves in mixer head 33. During the momentary negative pressure, the flow of combustion products at each exhaust end of the tailpipes 32 is reversed. The fresh charge which has been drawn in during the momentary negative pressure automatically ignites without the need for energization of the spark plug, and the explosive combustion repeats itself. A resonance is established in the respective tailpipes 32 at a frequency of approximately 100 hertz, and the pulse combustion burner 30 operates as a self-powered burner. During the operation of the pulse combustion burner 30, the liquid in vessel 20 is efficiently heated by thermal exchange with the combustion products passing through the tailpipes 32, and the combustion products are exhausted into the atmospheric air through the decouplers 51, exhaust muffler 52 and pipe 54.

In the heating apparatus, the total capacity of decouplers 51 is defined to be more than 10 times the capacity of combustion chamber 31. Thus, the decouplers 51 each can be formed approximately in a half size of a conventional decoupler of large capacity and assembled in a compact arrangement within the support frame 10 without remaining any useless dead space.

Although the preferred embodiment of the present invention has been shown and described, it should be understood that various modifications and rearrangements of the parts may be resorted to without departing from the scope of the invention as disclosed and claimed herein.

What is claimed is:

1. A pulse combustion heating apparatus comprising a liquid vessel assembled within a support frame to store an amount of liquid such as cooking oil or other fluid medium to be heated, and a pulse combustion burner mounted to said vessel and having a combustion chamber secured at its inlet end to a side wall of said vessel and immersed in the liquid in said vessel and at least a pair of tailpipes each connected at their inner ends to an exhaust port of said combustion chamber in such a manner that said tailpipes are arranged symmetrically in said vessel and immersed in the liquid and being extended outwardly from said vessel, wherein said vessel has a pair of parallel bottom walls inclined downwardly inwardly toward the center of said vessel, and a pair of cylindrical decouplers are housed in a pair of spaces just below the bottom walls of said vessel within said support frame, said decouplers being connected to each exhaust end of said tailpipes.

2. A pulse combustion heating apparatus as claimed in claim 1, wherein a cylindrical exhaust muffler is located just below said decouplers in a direction perpendicular to them and connected to both said decouplers, said exhaust muffler having an exhaust pipe connected thereto.

3. A pulse combustion heating apparatus as claimed in claim 2, wherein said exhaust pipe is extended upwardly along one side of said support frame.

4. A pulse combustion heating apparatus as claimed in claim 1, wherein the great part of said tailpipes is immersed in the liquid in said vessel.

5. A pulse combustion heating apparatus as claimed in claim 1, wherein the combustion chamber of said burner is integrally formed with an attachment flange which is secured to the inner surface of the side wall of said vessel, and said tailpipes are extended outwardly through the attachment flange of said combustion chamber and the side wall of said vessel.

* * * * *